United States Patent
Stork et al.

(10) Patent No.: US 6,693,275 B1
(45) Date of Patent: Feb. 17, 2004

(54) METHOD AND APPARATUS FOR INSPECTING BLOW MOLDED CONTAINERS

(75) Inventors: Wilmer D. Stork, Champaign, IL (US); Franklin C. McGauley, St. Joseph, IL (US)

(73) Assignee: Plastipak Packaging, Inc., Plymouth, MI (US)

( * ) Notice: Subject to any disclaimer, the term of this patent is extended or adjusted under 35 U.S.C. 154(b) by 0 days.

(21) Appl. No.: 09/533,465

(22) Filed: Mar. 23, 2000

(51) Int. Cl.$^7$ .................................................. G01D 5/36
(52) U.S. Cl. ........................ 250/223 B; 250/559.27; 250/559.28; 356/239.4; 356/240.1
(58) Field of Search ..................... 250/223 B, 223 R, 250/559.27, 559.28; 382/142; 348/127; 356/632, 240.1, 239.4, 239.5

(56) References Cited

U.S. PATENT DOCUMENTS

| | | | |
|---|---|---|---|
| 3,328,593 A | * | 6/1967 | Johnson et al. |
| 3,994,599 A | | 11/1976 | Southwell |
| 4,908,507 A | | 3/1990 | Imre et al. |
| 5,064,080 A | | 11/1991 | Young et al. |
| 5,289,266 A | * | 2/1994 | Shih et al. ................. 356/382 |
| 5,291,271 A | * | 3/1994 | Juvinall et al. ............. 356/382 |
| 5,305,081 A | | 4/1994 | Gooch et al. |
| 5,466,927 A | | 11/1995 | Kohler et al. |
| 5,510,610 A | | 4/1996 | Baldwin |
| 5,519,204 A | | 5/1996 | Rudd et al. |
| 5,528,026 A | | 6/1996 | Burri et al. |
| 5,650,851 A | | 7/1997 | Gagnon |
| 5,657,124 A | | 8/1997 | Zhang et al. |
| 5,665,958 A | | 9/1997 | Rudd et al. |
| 5,675,516 A | | 10/1997 | Bone et al. |
| 6,172,355 B1 | * | 1/2001 | Gast et al. ............. 250/223 B |

* cited by examiner

Primary Examiner—David V. Bruce
Assistant Examiner—Courtney Thomas
(74) Attorney, Agent, or Firm—Brooks Kushman P.C.

(57) ABSTRACT

A method and apparatus (16) for inspecting the thickness of conveyed blow molded containers (18) utilizes a laser source (22) for directing a laser beam (24) upwardly from the exterior of the conveyed containers toward the container bottoms so as to be reflected downwardly at both outer and inner surfaces (28, 30) of the container bottom. The downwardly reflected laser beams are detected by a detector (32) so as to measure the thickness of each container bottom along a predetermined path. The inspected blow molded containers (10) are conveyed upright and the inspection path is along a bottom (34) of the container while the containers are conveyed by a rotary wheel (40) that is driven at a constant speed.

2 Claims, 2 Drawing Sheets

METHOD AND APPARATUS FOR INSPECTING BLOW MOLDED CONTAINERS

TECHNICAL FIELD

This invention relates to a method and apparatus for inspecting the thickness of blow molded containers.

BACKGROUND ART

The thickness of blow molded containers has previously been statistically sampled by removing a certain small percentage of containers from a production line. With modern blow molding equipment capable of producing over 400 containers per minute, such sampling will account for less than 0.1 percent of the entire production run.

DISCLOSURE OF INVENTION

One object of the present invention is to provide an improved method for inspecting blow molded containers.

In carrying out the above object, the method for inspecting blow molded containers is performed by conveying rotatively oriented and upstanding blow molded containers on a rotary wheel along a path of conveyance and directing a laser beam upwardly from the exterior of the conveyed containers toward the exteriors of the container bottoms so the laser beam impinges along a predetermined path on each container and is reflected downwardly at both an outer surface and at an inner surface of the container bottom. The method also involves detecting the reflected laser beam from the outer and inner surfaces of the container to determine the thickness of the container between its outer and inner surfaces along the predetermined path. The wheel is relatively driven at a constant speed of rotation so the laser detection measures the container bottom thickness along the same path on each container. Furthermore, the method involves removing from the conveyor each container having a thickness that is out of tolerance with respect to a design specification.

The blow molded container inspection method described above allows inspection of up to 100 percent of the containers such that any containers that do not have thicknesses within the design specification can be removed from the others.

In the preferred method disclosed, the laser beam is directed upwardly to measure the thickness along a predetermined path along a bottom of each container. Furthermore, the blow molded containers are cyclically positioned in an outstanding manner on a wheel of the conveyor in an oriented manner just after being blow molded, and the wheel is rotatively driven at a constant speed of rotation so the laser detection measures the container bottom thickness along the same path on each container.

Another object of the present invention is to provide improved apparatus for inspecting blow molded containers.

In carrying out the immediately preceding object, the blow molded container inspection apparatus includes a conveyor for conveying blow molded containers. A laser source of the apparatus directs a laser beam upwardly from the exterior of rotatively oriented and upright containers conveyed on a rotary wheel toward the container bottoms so the laser beam impinges along a predetermined path along each container bottom and is reflected downwardly from both outer and inner surfaces of the container bottom. A detector of the apparatus detects the laser beam reflected downwardly from the outer and inner surfaces of each container bottom to measure the thickness along the predetermined path on each container bottom. The wheel has a drive that provides a constant speed of rotation so the laser detector measures the container bottom thicknesses along the same path on each container. An actuator of the apparatus removes from the conveyor containers having thicknesses that are out of tolerance with respect to a design specification.

Blow molded container inspection apparatus as described above in accordance with the invention allows inspection of the thicknesses of up to 100 percent of a production run of containers.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
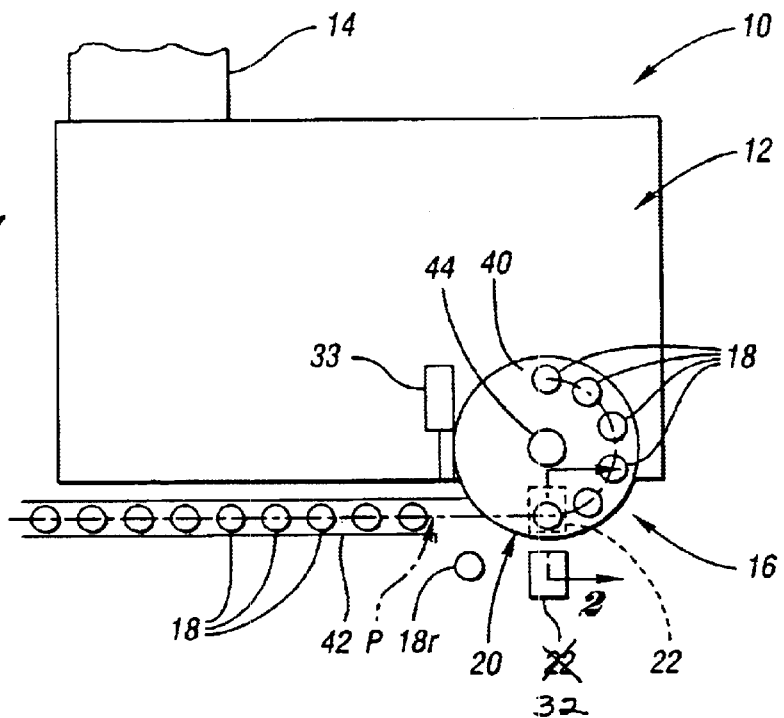
FIG. 1 is a schematic top plan view of a blow molding system that includes inspection apparatus constructed in accordance with the invention to provide the method thereof for inspecting the thickness of blow molded containers.

With reference to FIG. 1, a blow molding system generally indicated by 10 includes a blow molding machine 12 which is illustrated as being a machine that blow molds injection molded preforms which are heated in an oven 14 that is fed from an unshown supply of preforms. Inspection apparatus 16 is constructed in accordance with the present invention to provide up to 100 percent inspection of the thickness of containers 18 that are blow molded by the machine 12, with the inspection being performed just after the blow molding as is hereinafter more fully described. The method and apparatus of the invention will be described in an integrated manner to facilitate an understanding of all aspects of the invention. Furthermore, it should be appreciated that while the inspection apparatus 16 and its method of operation have particular utility when utilized with reheat type injection stretch blow molding of containers, it is also possible to utilize the inspection apparatus with other types of blow molding systems such as extrusion blow molding, preform injection molding and immediate blow molding without cooling, etc.

Figure 2:
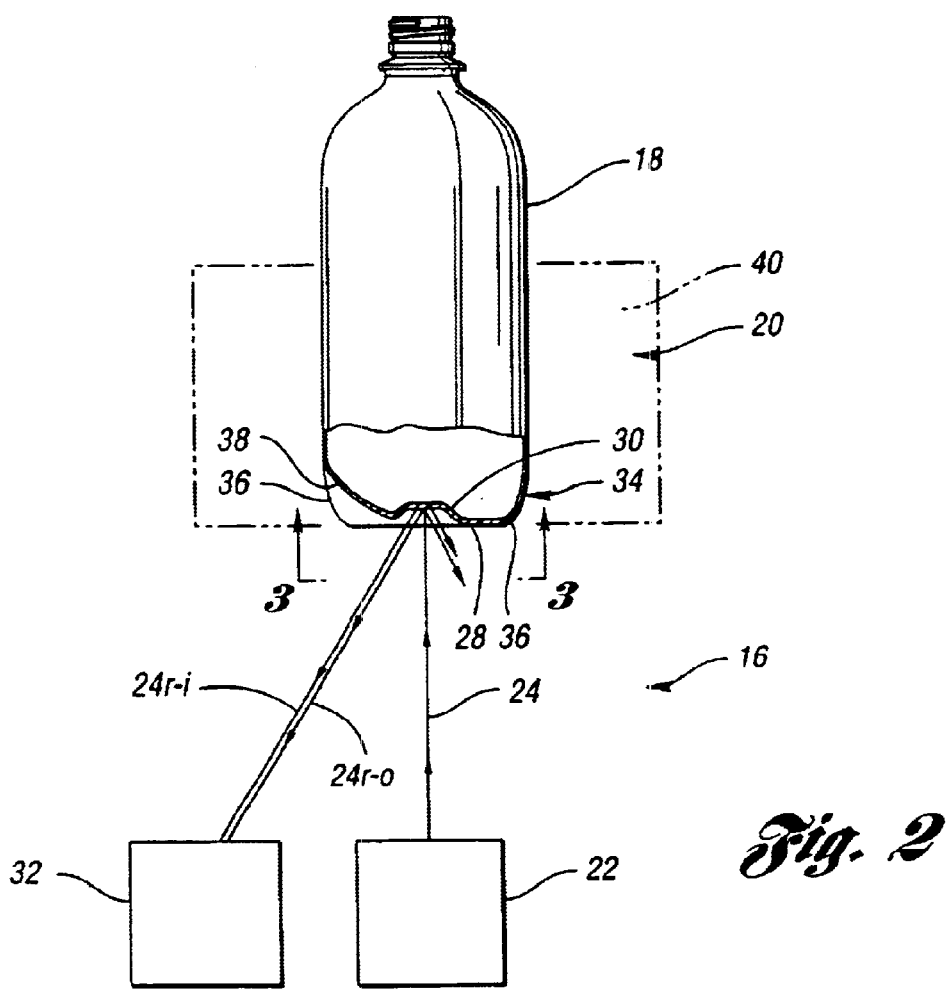
FIG. 2 is an elevational view partially broken away in section and taken along the direction of line 2—2 in FIG. 1 to illustrate the manner in which the container thicknesses are measured.
Figure 3:
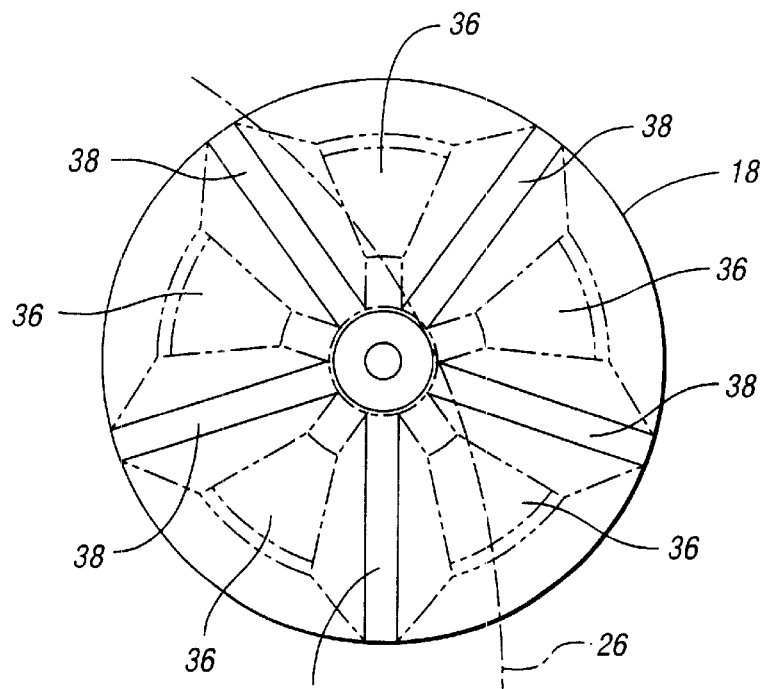
FIG. 3 is a bottom plan view of the container and also illustrates a path along which the thicknesses are inspected.
Figure 4:
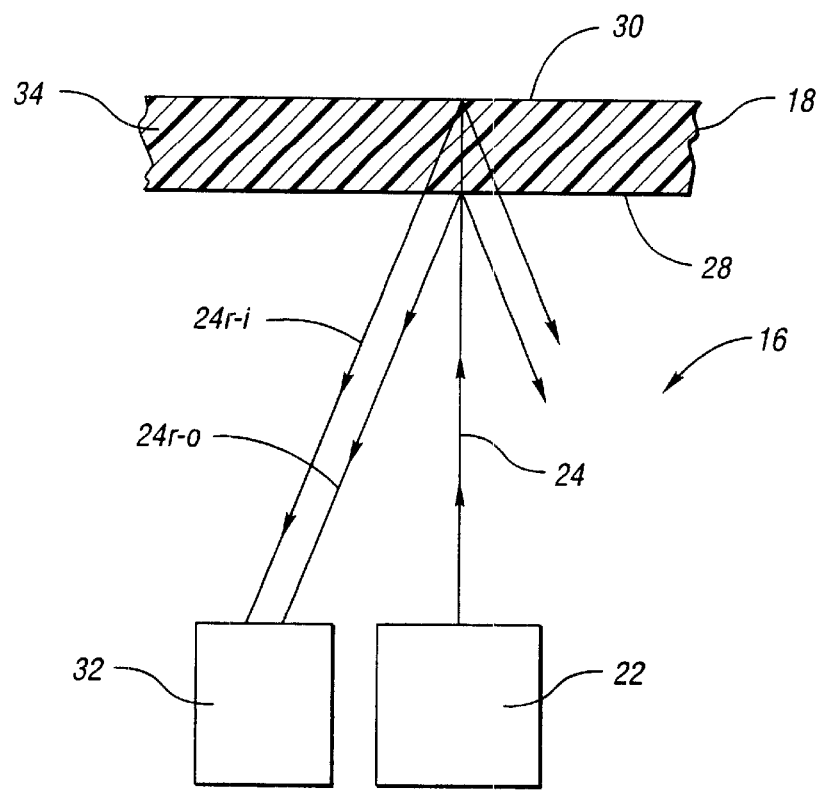
FIG. 4 is a schematic view similar to FIG. 2 but taken on an enlarged scale to illustrate the manner in which the container thickness is inspected.

With continuing reference to FIG. 1, the inspection apparatus includes a conveyor 20 for conveying blow molded containers along a path of conveyance P that is initially rotary and subsequently straight as is hereinafter more fully described. The inspection apparatus 16 also includes a laser source 22 which, as shown in FIG. 2, directs a laser beam 24 toward the conveyed containers 18 so as to impinge along an inspection path 26 as shown in FIG. 3. This laser beam 24 as illustrated in FIGS. 2 and 4 is directed from the exterior of the conveyed containers 18 toward the container exteriors and is reflected at an outer surface 28 of each container as well as being reflected at an inner surface 30 of the container. A detector 32 of the apparatus detects the laser beam $24_{r-o}$ reflected from the outer container surface 28 and also detects the laser beam $24_{r-i}$ reflected from the inner surface 30 and, by the spacing between these reflected beams, the detector determines the thickness of the container along the inspected path. An actuator 33 of the inspection apparatus is operable to remove from the conveyor 20 any containers which do not meet a design specification such as the container $18_r$ shown.

The manner in which the laser source 22 and detector 32 cooperate is more specifically disclosed by U.S. Pat. Nos. 5,519,204 Rudd et al. and U.S. Pat. No. 5,665,958 Rudd et al., the entire disclosures of which are hereby incorporated by reference.

As illustrated in FIGS. 2 and 3, the specific container 18 that is inspected is made by a reheat type injection stretch blow molding operation utilizing polyethylene terephthalate resin. Furthermore, the container 18 is illustrated as being made with a freestanding bottom 34 for supporting the container upright on a horizontal support surface. This freestanding bottom 34 includes a plurality of circumferentially spaced feet 36, five as illustrated, alternating with curved straps 38 of which there are also five in number. The type of container involved is more specifically disclosed in U.S. Pat. No. 5,064,080 of Young et al.

As illustrated by the drawings, the conveyor 20 conveys the containers 18 upright with their bottoms 34 facing downwardly and the laser source 22 directs the laser beam 24 upwardly so that the inspected path 26 shown in FIG. 3 is along the container bottom. The inspection apparatus as disclosed thus detects the thickness of the container bottoms and removes any containers which do not meet the design specification.

As illustrated in FIG. 1, the conveyor 20 includes a rotary wheel 40 that initially receives the blow molded containers 18 just after being blow molded by the machine 12, and the container also includes a linear run 42 along which the containers are conveyed after the inspection. It should be appreciated that while the actuator 33 is illustrated as removing the rejected containers 18r along the linear run 42, it may also possible for the containers to be removed while on the rotary wheel 40 before reaching the linear run. The wheel 40 receives the containers 18 in an oriented manner about a central vertical axis of the container, which is possible due to the configuration of the feet 36 and straps 38 of the container bottom 34. Furthermore, a constant speed rotary drive 44 drives the wheel 40 at a constant speed, and the laser source 22 directs the laser beam 24 upwardly toward the containers while they are still on the rotary wheel 40. The orientation of the conveyed containers and the constant speed driving of the wheel 40 results in the inspected path 26 shown in FIG. 3 being the same on each container.

While the best mode for practicing the invention has been described in detail, those familiar with the art to which this invention relates will recognize various alternative ways of practicing the invention as defined by the following claims.

What is claimed is:

1. A method for inspecting blow molded containers, comprising:

conveying on a rotary wheel newly blown molded containers with the containers positioned upright such that bottoms thereof face downwardly and are rotatively oriented;

directing a laser beam upwardly from the exterior of the conveyed containers toward the exteriors of the bottoms of the containers being conveyed on the wheel so the laser beam impinges along a predetermined path on the bottom of each container and is reflected downwardly at both an outer surface and at an inner surface of the bottom of the container;

detecting the downwardly reflected laser beam from the outer and inner surfaces of the bottom of the containers to determine the thickness of the container bottom between its outer and inner surfaces along the predetermined path; and removing from the other containers each containers having a thickness that is out of tolerance with respect to a design specification.

2. Apparatus for inspecting blow molded containers, comprising:

a conveyor including a wheel for conveying newly blow molded containers upright with bottoms thereof facing downwardly and with the containers rotatively oriented;

a laser source for directing a laser beam upwardly from the exterior of the conveyed containers toward the exterior of the bottoms of the conveyed containers so the laser beam impinges along a predetermined path along each container bottom and is reflected downwardly from both outer and inner surfaces of the container bottom;

a detector for detecting the laser beam reflected downwardly from the outer and inner surfaces of each container bottom to measure the thickness along the predetermined path on each container bottom; and an actuator for removing from the other containers any containers having thicknesses that are out of tolerance with respect to a design specification.

* * * * *